United States Patent [19]

Story et al.

[11] Patent Number: 5,359,505

[45] Date of Patent: Oct. 25, 1994

[54] LAMP OR FLASHLIGHT FOR USE IN CIGARET LIGHTER SHELL

[75] Inventors: Michael C. Story; Donald W. Murray, both of Arlington, Tex.

[73] Assignee: Zippo Manufacturing Company, Bradford, Pa.

[21] Appl. No.: 998,057

[22] Filed: Dec. 29, 1992

[51] Int. Cl.5 .............................................. F21L 7/00
[52] U.S. Cl. .................................. 362/200; 362/109; 362/205; 362/253; 362/207
[58] Field of Search ............... 362/109, 186, 200, 201, 362/207, 208, 253, 802, 204, 205, 155

[56] References Cited

U.S. PATENT DOCUMENTS

| | | | |
|---|---|---|---|
| D. 175,315 | 8/1955 | Quandt | D26/38 X |
| D. 178,159 | 6/1956 | Szamborski | D26/38 X |
| D. 183,537 | 9/1958 | Okada | D26/38 X |
| 1,321,153 | 11/1919 | Runnion | 362/109 |
| 1,565,173 | 12/1925 | Lyeso | 362/109 |
| 1,784,114 | 12/1930 | Schulte | 362/201 |
| 1,940,843 | 12/1933 | Britsch | 362/201 |
| 1,948,613 | 2/1934 | Britsch | 362/201 |
| 1,951,097 | 3/1934 | Lyeso | 362/109 |
| 1,995,141 | 3/1935 | Barber et al. | 362/201 |
| 2,020,352 | 11/1935 | Bolduc | 362/205 |
| 2,032,695 | 3/1936 | Gimera et al. | D27/159 X |
| 2,066,028 | 12/1936 | Britsch | 362/109 |
| 2,075,883 | 4/1937 | Britsch | 362/109 |
| 2,118,997 | 5/1938 | Zook | 362/201 X |
| 2,249,692 | 7/1941 | Gelardin | 362/200 |
| 2,406,071 | 8/1946 | Galter | 431/143 X |
| 2,412,313 | 12/1946 | Battersby et al. | 362/201 |
| 2,494,886 | 1/1950 | Leif | D26/38 X |
| 2,607,883 | 8/1952 | Berkowitz | 362/109 |
| 2,697,297 | 12/1954 | Newberg | 362/201 X |
| 2,867,753 | 1/1959 | Quandt | 362/200 X |
| 3,010,645 | 11/1961 | Mandelstam | 230/249.5 |
| 3,247,688 | 4/1966 | Godbe | 431/143 X |
| 3,344,266 | 9/1967 | Bramson | 362/109 |
| 4,429,352 | 1/1984 | Griffin | 362/189 |
| 5,030,811 | 7/1991 | von Gaisberg et al. | 219/268 |

*Primary Examiner*—Stephen F. Husar
*Attorney, Agent, or Firm*—Hodgson, Russ, Andrews, Woods & Goodyear

[57] ABSTRACT

A lighting assembly for use in a cigaret lighter shell is disclosed. The lighting assembly comprises an insulative case for housing a power supply, such as batteries, and conductors for establishing an electrical circuit that includes the batteries, the conductors, a light bulb, and the cigaret lighter shell. A reflector and lens may be provided to focus and direct the beam generated by the bulb. A resilient portion of one of the conductors is biased against a wall of the cigaret lighter shell to close the electrical circuit. An insulative tip is provided on an end of the conductor and may be manually manipulated to remove the conductor from contact with the shell wall to open the electrical circuit and place the flashlight in an unlocked off position. A groove may be provided in the case to receive the tip and maintain an open circuit to place the flashlight in a locked off position. When a lid of the cigaret lighter is closed, the lid engages the tip to remove the conductor from contact with the shell wall and turn the flashlight off.

22 Claims, 3 Drawing Sheets

3,359,505

LAMP OR FLASHLIGHT FOR USE IN CIGARET LIGHTER SHELL

BACKGROUND OF THE INVENTION

The present invention relates generally to lamps or flashlights and particularly to a flashlight adapted for insertion into a cigaret lighter shell.

Lamps and flashlights of different shapes and sizes and utilizing different on/off switches are well known. Miniature flashlights come in many sizes and shapes, however these flashlights are often too large or bulky or have shapes which are inconvenient for carrying. The outer casings or shells for these miniature flashlights are often complex from a manufacturing standpoint which adds to the cost of the flashlights. Finally, these miniature flashlights are typically not well suited for the rugged storage and carrying conditions to which they are often subjected.

SUMMARY OF THE INVENTION

It is therefore an object of the present invention to provide a lighting assembly adapted for insertion into a cigaret lighter shell.

It is a further object of the present invention to provide a flashlight having a size and shape which is convenient to carry and use.

It is a still further object of the present invention to provide a flashlight that may utilize a cigaret lighter shell as an outer casing or shell.

It is a still further object of the present invention to provide a flashlight which is well suited for rugged storage and carrying conditions.

It is a still further object of the present invention to provide a flashlight adapted for insertion into a cigaret lighter shell which may be easily turned on and off when a lid of the cigaret lighter shell is open.

It is a still further object of the present invention to provide a flashlight adapted for insertion into a cigaret lighter shell which may be placed in a locked off position so that the light will stay off even when the lid of the cigaret lighter shell is open.

Toward the fulfillment of these and other objects, the apparatus of the present invention features a lighting assembly adapted for insertion into a cigaret lighter shell. The lighting assembly includes an insulative case for housing a power supply such as batteries, and conductors for establishing an electrical circuit that includes the batteries, the conductors, a light bulb and the cigaret lighter shell. A resilient portion of one conductor is biased against a wall of the cigaret lighter shell to close the electrical circuit and place the flashlight in an on position. An insulative tip is provided on an end of the conductor and may be manually manipulated to remove the conductor from contact with the shell wall to open the electrical circuit and place the flashlight in an unlocked off position. A groove may also be provided in the insulative case to receive the tip and hold the conductor in a locked off position. When a lid of the cigaret lighter shell is closed, the lid engages the tip to remove the conductor from contact with the shell wall and turn the flashlight off.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
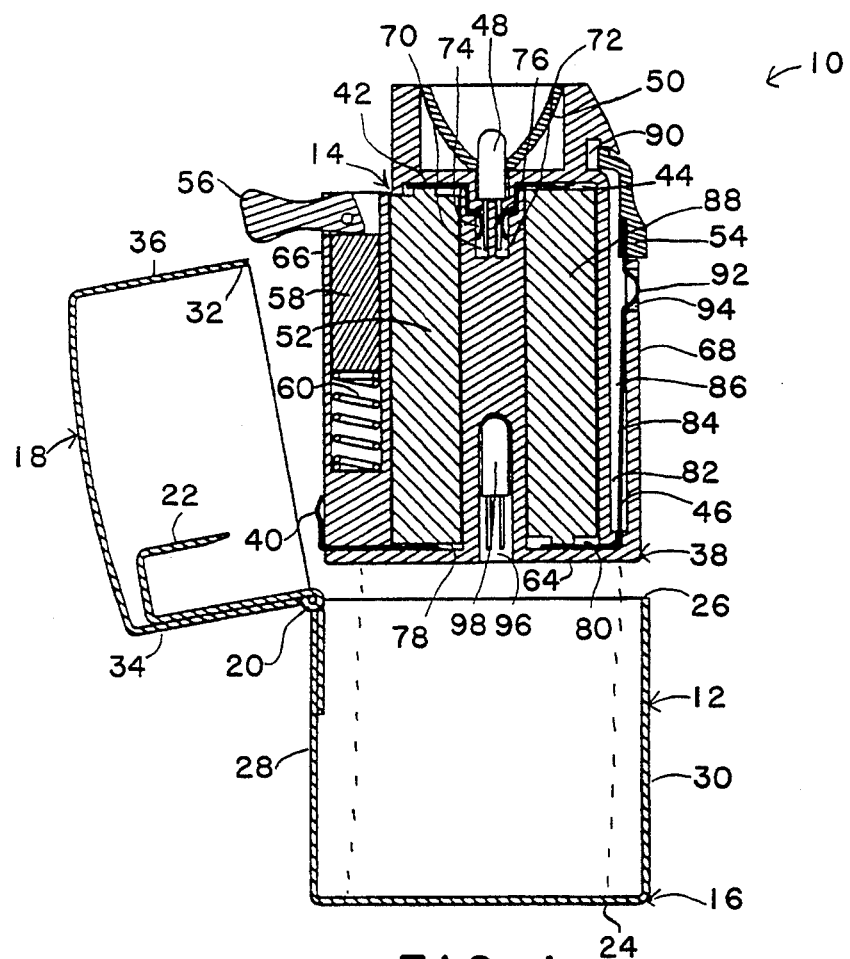
FIG. 1 is an elevated cross-sectional view of a lighting assembly and shell of the present invention showing the lighting assembly removed from the shell.

In FIG. 1, the reference numeral 10 designates a lamp or flashlight incorporating features of the present invention. The flashlight 10 is comprised of a cigaret lighter shell or container 12 and a lighting assembly 14.

The shell 12 has a base 16 and a lid 18, connected by a hinge 20. A bracket 22 is secured to an inner wall of the lid 18 for reasons to be described. The base 16 has a floor 24, a lip 26, a rear wall 28, a front wall 30, and two side walls. The lid 18 has a roof, a lip 32, a rear wall 34, a front wall 36, and two side walls.

Figure 5:
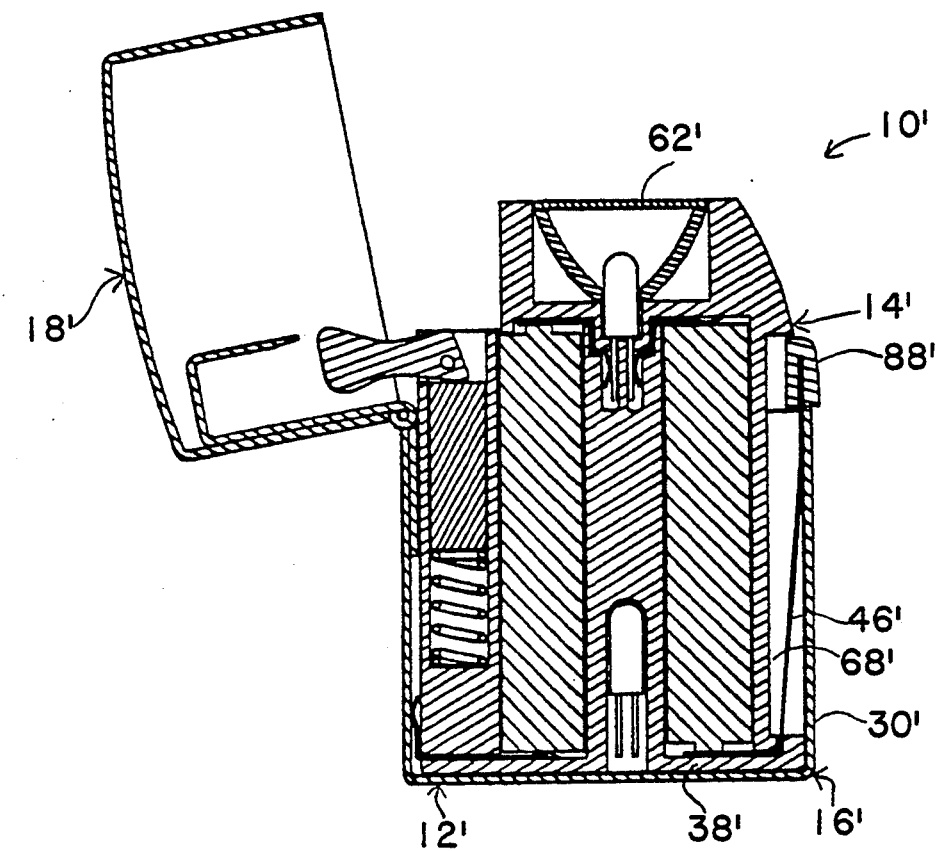
FIG. 5 is an elevated cross-sectional view of an alternate embodiment of the flashlight of the present invention in an on position.

The lighting assembly 14 is adapted to be inserted into the shell 12 and comprises an insulative case 38 and conductors 40, 42, 44 and 46. A light bulb 48, a reflector 50, a power supply or batteries 52 and 54, a lever 56, a plunger 58, and a spring 60 may also be supplied. The lighting assembly 14 may also be provided with a lens 62' as shown in FIG. 5.

The case 38 has a bottom wall 64, a rear wall 66, a front wall 68, and may have two side walls. An upper portion of the case 38 has apertures 70 and 72 for receiving and retaining electrodes 74 and 76 of the light bulb 48. An upper portion of the case 38 also extends about and above the light bulb 48 to secure the optional reflector 50 and lens 62 in place for focusing and directing a beam of light generated by the bulb 48. The lever 56, plunger 58, and spring 60 combination are secured within an aperture in the case 38 near the rear wall 66 of the case 38 and function to retain the lid 18 in the closed position. The lever 56, plunger 58, and spring 60 combination are well known to those of ordinary skill in the art and will therefore not be discussed in greater detail.

The case 38 has apertures 78 and 80 for receiving and retaining batteries 52 and 54. A portion of the conductor 40 is disposed within the case 38 near the bottom wall 64 and extends into the aperture 78 for contacting an electrode of the battery 52. Another portion of the conductor 40 extends outwardly from the rear wall 66 of the case 38 to contact the rear wall 28 of the base 16 when the lighting assembly 14 is inserted into the base 16 of the shell 12. A portion of the conductor 42 is disposed within an upper portion of the base 38 and extends into the aperture 78 for contacting an electrode of the battery 52.

The conductor 42 extends through the case so that another portion of the conductor 42 extends into the aperture 70 for contacting the electrode 74 of the bulb 48. The electrode 74 is connected to the filament of the bulb 48 which is in turn connected to the other electrode 76 of the bulb 48. A portion of the conductor 44 extends into the aperture 72 for contacting the electrode 76 of the bulb 48. The conductor 44 extends through an upper portion of the case 38 so that another portion of the conductor 44 extends into the aperture 80 for contacting an electrode of the battery 54.

Figure 2:
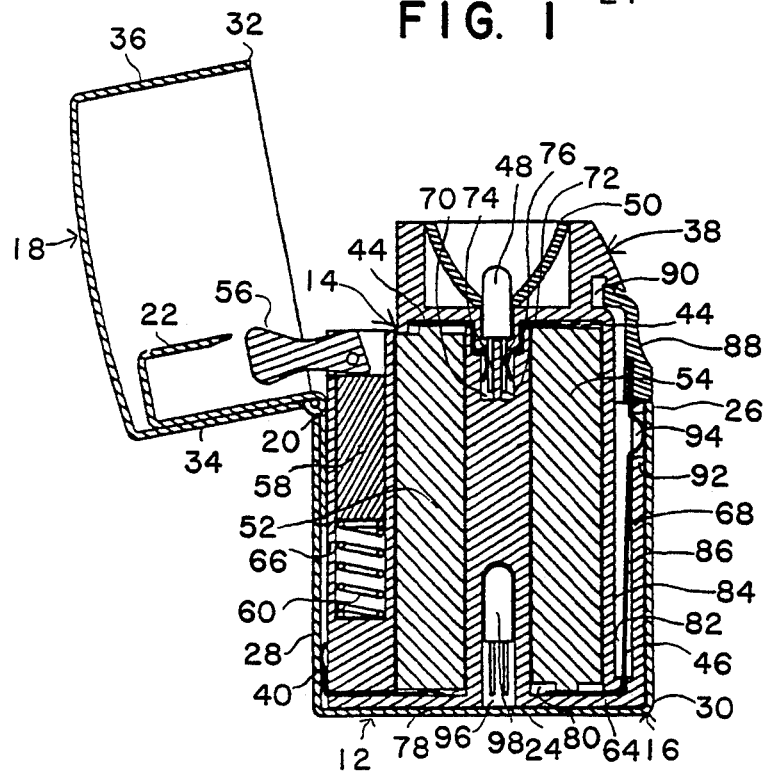
FIG. 2 is an elevated cross-sectional view of a flashlight of the present invention, showing the lighting assembly inserted into the shell and showing the flashlight in an on position.
Figure 3:
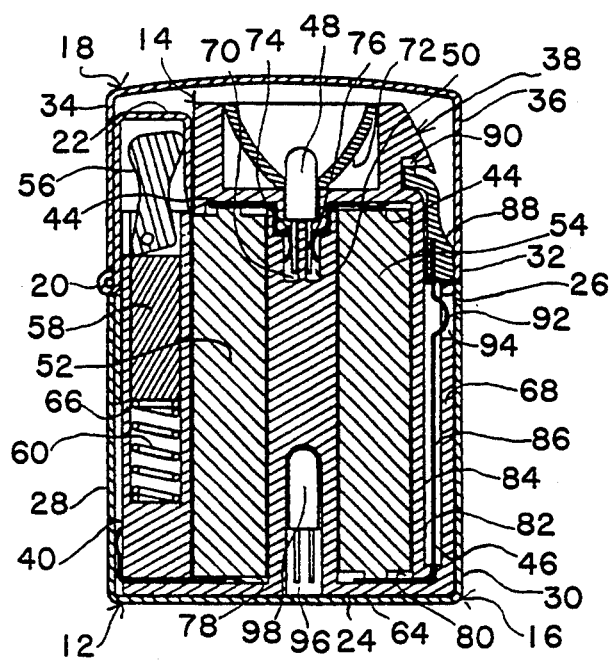
FIG. 3 is an elevated cross-sectional view of the flashlight of the present invention, showing the lighting assembly inserted into the shell and showing the flashlight in an off position.
Figure 4:
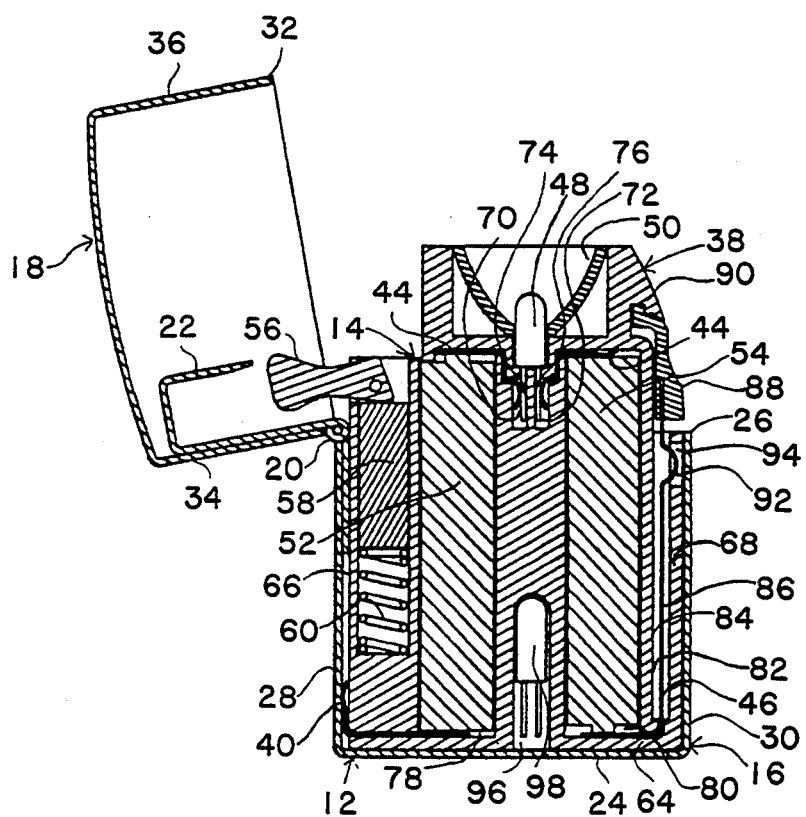
FIG. 4 is an elevated, cross-sectional view of the flashlight of the present invention in a locked off position.

A portion of the conductor 46 is disposed in the case 38 near the bottom wall 64 and extends into the aperture 80 for contacting the electrode of the battery 54. A channel 82 having an inner wall 84 and an outer wall 86 is provided near the front wall 68 of the insulative case 38. A resilient portion of the conductor 46 extends within the channel 82 over substantially the entire length of the channel 82 at an acute angle to the inner wall 84. The acute angle formed is very small and is typically less than five degrees, even when a portion of the conductor 46 is biased against the front wall 30 of the shell 12 so that the flashlight is in the on position (FIG. 2). An insulative tip 88 is secured to an end portion of the conductor 46. For reasons to be described, an upper portion of the tip is sized to nest within a groove 90 when the tip 88 is pushed away from the front wall 68 of the case 38. A lower portion of the tip 88 has an upper surface which is angled away from the front wall 68 of the case 38 and the front wall 30 of the base 16 of the shell 12.

A medial portion of the conductor 46 is bent to form a protrusion 92 which extends toward the front wall 68 of the case 38 and the front wall 30 of the base 16 of the shell 12. An aperture 94 in the front wall 68 of the case 38 permits the protruding portion 92 of the conductor 46 to contact and bias against the front wall 30 of the base 16 of the shell 12. Although the protrusion 92 depicted is semi-spherical, the protrusion 92 may take any number of shapes or may be formed by a knob or other protuberance extending outwardly from the conductor 45. Also, the groove 90 for nestingly engaging the tip 88 may be used regardless of whether a channel 82, protrusion 92, or aperture 94 are used.

In an alternate embodiment depicted in FIG. 5, no channel 82, groove 90, or protrusion 92 are utilized. Instead, a resilient portion of the conductor 46' extends outwardly from the front wall 68' of the case 38' and alongside the front wall 68' of the case 38' over substantially its entire length. An insulative tip 88' is secured to an end portion of the conductor 46'. For reasons to be described, the tip 88' is disposed so that a top portion of the tip 88' is angled toward the front wall 68' of the insulative case 38' and away from the front wall 30' of the base 16' of the shell 12'.

As shown in FIGS. 1 through 5, an aperture 96 may be provided to store an extra bulb 98 within the case 38.

In operation, the lighting assembly' 14 is inserted into the base 16 of the shell 12. A portion of the conductor 40 is placed in permanent contact with the rear wall 28 of the base 16 near the floor 24 of the base 16. When the lid 18 is in the open position (FIG. 2), protrusion 92 of the conductor 46 extends through the aperture 94 in the front wall 68 of the case 38 and is biased against the front wall 30 of the base 16. The base 16 of the shell 12 is composed of a conductive material, such as a metal, so that an electrical current may pass from the conductor 46 to the conductor 40 to complete an electrical circuit which includes the batteries 52 and 54, the bulb 48, the conductors 40, 42, 44, and 46, and the base 16 of the shell 12, thereby placing the flashlight in an on position.

With the lid 18 in the closed position (FIG. 3), the lid 18 contacts an angled top portion of the tip 88, and the lip 32 of the lid 18 pushes the tip 88 away from the front wall 30 of the base 16 of the shell 12 to open the electrical circuit and place the flashlight in an unlocked off position. When the lid 18 is placed in the open position (FIGS. 2 and 4), the tip 88 may be manually pushed away from the front wall 30 of the base 16 of the shell 12 so that the protruding portion 92 of the conductor 46 is removed from contact with the front wall 30 of the base 16 of the shell 12 to open the electrical circuit and place the flashlight in an unlocked off position.

Once in the unlocked off position, the tip 88 may also be pushed upwardly so that an upper portion of the tip 88 slides into and nests within the groove 90 to place the flashlight in a locked off position (FIG. 1). In the locked off position, the electrical circuit will remain open regardless of whether the lid 18 is in the open or closed positions.

An alternate embodiment depicted in FIG. 5 does not utilize a channel 82, a protrusion 92, a groove 90, or an aperture 94 in the front wall 68 of the case 38 and does not provide a locked off position. Nonetheless, the tip 88' may still be manually manipulated to place the flashlight 10' in an unlocked off position or an on position. In the alternate embodiment, the lid 18' also engages the tip 88' when the lid 18' is in the closed position to remove the conductor 46' from contact with the front wall 30' of the base 16' of the shell 12' to open the electrical circuit and place the flashlight in an unlocked off position.

Several advantages result from the foregoing combination. For example, the present invention discloses a lighting assembly 14 which may be inserted into a cigaret lighter shell 12. The flashlight 10 has a size and shape which is convenient to carry and use, and the cigaret lighter shell 12 makes the flashlight 10 well suited for rugged storage and carrying conditions. The manually operable tip 88 permits the flashlight to be turned on or off even when the lid 18 is open, and the locked off position permits the flashlight to remain off even when the lid 18 is open.

It is understood that variations may be made in the present flashlight without departing from the scope of the present invention. For example, the base 16 of the shell 12 need not be made of a conductive material as long as an electrically conductive path is provided across the base 16 between the conductor 46 and the conductor 40. Additionally, the reflector 50 and lens 62' may be omitted or may be removable so that the bulb 48 provides an unfocused, substantially spherical source of light. The lighting assembly of the present invention may also be utilized with shells other than cigaret lighter shells. Further, the flashlight may use one, two, or more batteries depending upon the size and shape of the container or shell utilized. Further still, bulbs other than the bi-pin bulb 48 depicted may be used. As illustrated by the embodiment depicted in FIG. 5, the channel 82, groove 90, protrusion 92, and aperture 94 in the front wall 68 of the case 38 are optional, and an unlocked off position need not be provided.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A flashlight comprising:
   an insulative case adapted for insertion into a cigaret lighter shell and having an aperture for retaining a power supply;
   a light bulb secured to an upper portion of said case;
   a conductor having a proximal end disposed within said case for establishing an electrical contact with said power supply, and having a resilient distal end extending from said case; and
   means for completing an electrical circuit to permit electricity to pass from said power supply through said light bulb and said conductor;
   said distal end of said conductor being movable between a first position in which said conductor is in contact with said means for completing an electrical circuit and a second position in which said conductor is removed from contact with said means for completing an electrical circuit.

2. The flashlight of claim 1 wherein said means for completing an electrical circuit comprises a metal cigaret lighter shell.

3. The flashlight of claim 2 further comprising an insulative tip secured to said distal end of said conductor.

4. The flashlight of claim 3 wherein:
   said shell has a base and a lid, movable between an open and a closed position;
   said conductor contacts said base of said shell when said conductor is in said first position; and
   said tip is disposed to engage said lid when said lid is moved to said closed position so that said lid forces said conductor to said second position, removed from contact from said base.

5. The flashlight of claim 4 wherein:
   said case has a top, a bottom, a front wall, and a channel extending through said case near said front wall;
   said proximal end of said conductor is disposed within said case near said bottom of said case;
   said conductor has a resilient medial portion, and said medial portion and said distal end of said conductor extend through said channel to form an acute angle with an inner wall of said channel.

6. The flashlight of claim 5 wherein said acute angle is less than approximately five degrees when said conductor is in said first position.

7. The flashlight of claim 5 wherein said tip is secured to said distal end of said conductor so that said tip extends above said top of said base to permit said conductor to be manually moved between said first and second positions when said lid is in said open position.

8. The flashlight of claim 7 wherein said case has a groove disposed near said top of said front wall of said case to nestingly engage said tip to retain said conductor in said second position.

9. The flashlight of claim 8 further comprising:
   a lever hingedly secured to an upper portion of said case; and
   a bracket rigidly secured to an inner wall of said lid;
   said lever being adapted to slidably engage said bracket to permit said lid to be moved to said open and said closed positions, and said lever being configured to fit within said bracket when said lid is in said closed position for retaining said lid in said closed position.

10. The flashlight of claim 9 wherein said power supply comprises at least one battery.

11. A flashlight comprising:
    a shell having a base and a lid which may be placed in an open or closed position;
    an insulative case nested within said shell, said case having an aperture for retaining a power supply;
    a light bulb secured within said case;
    means for establishing an electrical circuit to pass electricity from said power supply through said light bulb and through at least a portion of said base, said means for establishing an electrical circuit including a resilient conductor having a proximal end disposed within said case and a distal end extending outwardly from said case, said conductor being movable between a first position, in which said conductor contacts said base to close said electrical circuit and to place said flashlight in an on position, and a second position in which said conductor is removed from contact with said base to open said electrical circuit and to place said flashlight in an unlocked off position;
    an insulated tip secured to said distal end of said conductor and disposed so that, when said lid is in said open position, said tip allows said conductor to contact and bias against said base to close said electrical circuit, and when said lid is in said closed position, said tip engages said lid to move said conductor to said second position.

12. The flashlight of claim 11 wherein said case has a groove adapted to nestingly engage said tip to retain said conductor in a third, locked off, position in which said conductor is removed from contact with said base.

13. The flashlight of claim 12 wherein said container comprises a cigaret lighter container.

14. The flashlight of claim 13 wherein said power supply comprises two batteries.

15. A lighting assembly comprising:
    an insulative case adapted to be inserted into a cigaret lighter shell, said case having an aperture for receiving a power supply, means for receiving a light bulb, and a channel extending through said case near a front wall of said case, said front wall having an aperture extending through an upper portion of said front wall to said channel;
    a conductor having a proximal end disposed within said case and having a resilient distal end extending upwardly through said channel and having a medial, protruding portion which protrudes toward said front wall of said case, said protruding portion registering with said aperture of said front wall of said case to permit said protruding portion to pass through said front wall aperture to contact said shell when said case is inserted into said shell;
    weans adapted for establishing an electrical circuit to pass electricity from said power supply and through said light bulb, said conductor, and said shell, when said case is inserted into said shell;
    said distal end of said conductor being movable between a first position, in which said protruding portion of said conductor is adapted to contact said shell to close said circuit when said case is inserted into said shell, and a second position, in which said protruding portion of said conductor is adapted to be removed from contact with said shell to open said circuit when said case is inserted into said shell.

16. The lighting assembly of claim 15 further comprising:
a metal cigaret lighter shell;
a power supply; and
a light bulb.

17. The lighting assembly of claim 16 wherein said shell has a base and a lid movable between an open and a closed position; and further comprising an insulative tip secured to said distal end of said conductor and disposed to engage said lid when said lid is in said closed position so that said lid forces said conductor away from said base to remove said protruding portion of said conductor from contact with said shell, thereby placing said conductor in said second position.

18. The lighting assembly of claim 17 wherein said case has a groove adapted to nestingly engage said tip to retain said conductor in a third, locked off, position in which said protruding portion of said conductor is removed from contact with said base.

19. The lighting assembly of claim 18 further comprising:
a lever hingedly secured to an upper portion of said case; and
a bracket rigidly secured to an inner wall of said lid; said lever being adapted to slidably engage said bracket to permit said lid to be moved between said open and said closed positions, and said lever being configured to fit within said bracket when said lid is in said closed position to reduce movement of said case relative to said container.

20. The lighting assembly of claim 19 wherein said case has an aperture for receiving and storing a spare light bulb.

21. A flashlight comprising: a case adapted for insertion into a shell which includes a lid movable between open and closed positions, said case including means for retaining a power supply; a light bulb secured to said case; a conductor having a first end portion disposed for establishing an electrical contact with the power supply and having a resilient second end portion; means for completing an electrical circuit to permit electricity to pass from said power supply through said light bulb and said conductor; and means responsive to opening of the lid for moving said second end portion of said conductor from a first position in which said conductor is removed from contact with said means for completing an electrical circuit to a second position in which said conductor is in contact with said means for completing an electrical circuit.

22. The flashlight of claim 21 wherein said shell is a cigaret lighter shell.

* * * * *